United States Patent
Elboim

(10) Patent No.: US 9,075,926 B2
(45) Date of Patent: Jul. 7, 2015

(54) DISTRIBUTED INTERCONNECT BUS APPARATUS

(75) Inventor: Yaron Elboim, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 333 days.

(21) Appl. No.: 12/021,290

(22) Filed: Jan. 28, 2008

(65) Prior Publication Data

US 2009/0024782 A1    Jan. 22, 2009

Related U.S. Application Data

(60) Provisional application No. 60/950,691, filed on Jul. 19, 2007.

(51) Int. Cl.
*G06F 13/40* (2006.01)

(52) U.S. Cl.
CPC ........ *G06F 13/4059* (2013.01); *G06F 13/4045* (2013.01); *G06F 2213/0026* (2013.01)

(58) Field of Classification Search
CPC .................................................. G06F 13/4045
USPC .......................................................... 710/312
See application file for complete search history.

(56) References Cited

U.S. PATENT DOCUMENTS

| | | | |
|---|---|---|---|
| 4,862,454 A * | 8/1989 | Dias et al. ..................... | 370/235 |
| 5,825,617 A | 10/1998 | Kochis et al. | |
| 5,923,757 A | 7/1999 | Hocker et al. | |
| 5,926,629 A * | 7/1999 | Gulick ........................... | 710/117 |
| 5,930,368 A | 7/1999 | Hocker et al. | |
| 6,170,026 B1 | 1/2001 | Kimura et al. | |
| 6,226,700 B1 | 5/2001 | Wandler et al. | |
| 6,396,809 B1 * | 5/2002 | Holden et al. ................ | 370/236 |
| 6,499,079 B1 | 12/2002 | Gulick | |
| 6,798,775 B1 * | 9/2004 | Bordonaro et al. ........... | 370/392 |
| 6,898,766 B2 * | 5/2005 | Mowery et al. ................... | 716/1 |
| 6,937,468 B2 | 8/2005 | Lin et al. | |
| 7,058,738 B2 * | 6/2006 | Stufflebeam, Jr. ............ | 710/104 |
| 7,079,544 B2 * | 7/2006 | Wakayama et al. ........... | 370/401 |
| 7,096,310 B2 * | 8/2006 | Norden ......................... | 710/317 |
| 7,293,129 B2 * | 11/2007 | Johnsen et al. ................ | 710/313 |
| 7,320,080 B2 * | 1/2008 | Solomon et al. .............. | 713/320 |
| 7,340,555 B2 * | 3/2008 | Ashmore et al. .............. | 710/313 |

(Continued)

FOREIGN PATENT DOCUMENTS

| TW | 200709616 | 3/2007 |
|---|---|---|
| WO | 0111476 A1 | 2/2001 |

OTHER PUBLICATIONS

PCI Express Base Specification Revision 1.0 Jul. 22, 2002.*

(Continued)

*Primary Examiner* — Paul R Myers

(57) ABSTRACT

A distributed interconnect bus apparatus for connecting peripheral devices. The apparatus can be utilized to wirelessly connect peripheral devices or to allow the connectivity of such devices over a network. The apparatus includes a first bridge coupled to a root component of an interconnect bus; and a second bridge coupled to an endpoint component of an interconnect bus. The apparatus may further include an acknowledgment (ACK) termination for generating at least an ACK signal; and a flow control mechanism including at least one receiver buffer for temporarily saving data packets of multiple different transactions.

17 Claims, 5 Drawing Sheets

(56) References Cited

U.S. PATENT DOCUMENTS

| | | | |
|---|---|---|---|
| 7,356,635 B2* | 4/2008 | Woodings et al. | 710/311 |
| 7,363,404 B2* | 4/2008 | Boyd et al. | 710/104 |
| 7,467,313 B2* | 12/2008 | Han et al. | 713/320 |
| 7,469,366 B1* | 12/2008 | Reed | 714/704 |
| 7,519,761 B2* | 4/2009 | Gregg | 710/316 |
| 7,525,986 B2* | 4/2009 | Lee et al. | 370/462 |
| 7,543,096 B2* | 6/2009 | Davies | 710/268 |
| 7,596,646 B2 | 9/2009 | Kim et al. | |
| 7,916,750 B2* | 3/2011 | Das Sharma et al. | 370/469 |
| 8,006,014 B2* | 8/2011 | Lai et al. | 710/116 |
| 8,050,290 B2* | 11/2011 | Tamir et al. | 370/466 |
| 8,374,157 B2 | 2/2013 | Tamir et al. | |
| 8,472,436 B2 | 6/2013 | Meiri et al. | |
| 2002/0080756 A1 | 6/2002 | Coppola et al. | |
| 2003/0198015 A1 | 10/2003 | Vogt | |
| 2004/0122771 A1 | 6/2004 | Celi et al. | |
| 2004/0208130 A1* | 10/2004 | Mizutani et al. | 370/242 |
| 2004/0220803 A1 | 11/2004 | Chiu et al. | |
| 2005/0047079 A1 | 3/2005 | Gasbarro et al. | |
| 2005/0075080 A1 | 4/2005 | Zhang | |
| 2005/0220173 A1 | 10/2005 | Zyren et al. | |
| 2005/0246470 A1 | 11/2005 | Brenner | |
| 2005/0248502 A1* | 11/2005 | Okuley et al. | 345/1.3 |
| 2005/0262269 A1* | 11/2005 | Pike | 710/1 |
| 2005/0278756 A1 | 12/2005 | Brown | |
| 2006/0050707 A1 | 3/2006 | Sterin | |
| 2006/0061963 A1 | 3/2006 | Schrum | |
| 2006/0080722 A1 | 4/2006 | Santhoff | |
| 2006/0126612 A1 | 6/2006 | Sandy et al. | |
| 2006/0129709 A1* | 6/2006 | Bandholz et al. | 710/30 |
| 2006/0143338 A1 | 6/2006 | Hunsaker et al. | |
| 2006/0206655 A1* | 9/2006 | Chappell et al. | 710/315 |
| 2006/0222125 A1* | 10/2006 | Edwards et al. | 375/354 |
| 2006/0233191 A1 | 10/2006 | Pirzada et al. | |
| 2006/0251096 A1 | 11/2006 | Metsker | |
| 2007/0067551 A1* | 3/2007 | Ikeda et al. | 710/315 |
| 2007/0173202 A1 | 7/2007 | Binder et al. | |
| 2007/0189270 A1 | 8/2007 | Borislow et al. | |
| 2007/0198763 A1* | 8/2007 | Suzuki et al. | 710/316 |
| 2007/0283181 A1* | 12/2007 | Shelton et al. | 713/400 |
| 2007/0291636 A1 | 12/2007 | Rajagopal et al. | |
| 2008/0018491 A1 | 1/2008 | Berkman et al. | |
| 2008/0071961 A1* | 3/2008 | Higuchi et al. | 710/312 |
| 2008/0147904 A1* | 6/2008 | Freimuth et al. | 710/22 |
| 2008/0219376 A1 | 9/2008 | Qi et al. | |
| 2008/0288705 A1* | 11/2008 | Tamir et al. | 710/305 |
| 2012/0017015 A1 | 1/2012 | Tamir et al. | |
| 2013/0124762 A1 | 5/2013 | Tamir et al. | |

OTHER PUBLICATIONS

PCI Express Ethernet Networking, Sep. 2005 Intel White Paper.*
International Search Report and the Written Opinion of the International Searching Authority for the corresponding International Application No. PCT/US2008/070405, dated Jan. 28, 2009.
John Chiang, "Advanced Switching Versus PCI-Express for Peer-to-Peer Communications," May, 2004, ASI-SIG, Vitesse Semiconductor Corp., Camarillo, CA. Retrieved Mar. 12, 2009.
Taiwan IPO, "Office Action in Primary Examination including Search Report"; issued Nov. 15, 2013 for corresponding Taiwan Patent Application No. 097127326; English translation attached (pp. 15-29).
Digital-Logic AG: "Solution Guide Embedded Computer 2008, vol. II" (Fall issue), Sep. 5, 2008,Digital-Logic AG, Switzerland, Retrieved date Oct. 8, 2009.
PC/104 Embedded Consortium: "What is PCI/104-Express (TM)?", Rev. A, published Apr. 3, 2008.

* cited by examiner

DISTRIBUTED INTERCONNECT BUS APPARATUS

CROSS-REFERENCE TO RELATED APPLICATIONS

This application claims the benefit of U.S. Provisional Application No. 60/950,691 filed on Jul. 19, 2007, the contents of which are herein incorporated by reference.

TECHNICAL FIELD

The invention relates generally to interconnect buses for providing peripheral component connectivity.

BACKGROUND OF THE INVENTION

Peripheral component interconnect Express™ (PCI Express or PCIe) is a high performance, generic and scalable system interconnect for a wide variety of applications ranging from personal computers to embedded applications. PCIe implements a serial, full duplex, multi-lane, point-to-point interconnect, packet-based, and switch based technology. Current versions of PCIe buses allow for a transfer rate of 2.5 Giga bit per second (Gbps) or 5 Gbps, per lane, with up to 32 lanes. The PCIe bus is fully described in the PCI Express™ base Specification reversion 1.0a published on Apr. 15, 2003, by the PCI-SIG, incorporated herein by reference in its entirety merely for the useful understanding of the background of the invention.

The roundtrip time of a PCIe bus is a major factor in degrading the performance of the bus. With reference to FIG. 1, the roundtrip is the time period elapsed from the transmission of data, for example, by a PCIe root 110 to the acknowledgment of the data reception by a PCIe endpoint 120.

The roundtrip time of the PCIe bus 100 depends on the delay of a link 130 between the PCIe root 110 and the PCIe endpoint 120. Typically, this delay is due to an acknowledged (ACK) and flow control update latencies caused by the layers of a PCIe bus. Abstractly, the PCIe is a layered protocol bus, consisting of a transaction layer, a data link layer, and a physical layer. The data link layer waits to receive an ACK signal for transaction layer packets during a predefined time window. If an ACK signal is not received during this time window, the transmitter (either at the PCIe root 110 or endpoint 120) resends the unacknowledged packets. This result in inefficient bandwidth utilization of the bus as it requires retransmission of packets with no data integrity problem. That is, high latency on the link 130 causes poor bandwidth utilization.

In addition, a typical PCIe bus includes a credit mechanism in order to avoid receiver buffer overflow. As the latency of a PCIe bus is typically low, the root 110 and endpoint 120 often implement small receiver buffers with a small number of credits. The fast PCIe link enables fast flow controls (credits) update and full bus performance. However, when the bus latency increases the small number of flow control credits is a major limitation. Even if the receiver buffer is available, the flow control packet delay causes the transmitter (either at the PCIe root 110 or endpoint 120) to be idle for a long period prior to sending data. The result is an idle PCIe bus with low bandwidth utilization.

In a typical PCIe bus architecture the PCIe root 110 is directly coupled to the PCIe endpoint 120. In fact, the root 110 and the endpoint 120 are typically connected on the same electric board. Therefore, the roundtrip time is usually very short and the PCIe is not designed to properly operate in high latency. In order to provide applications and devices in which the PCIe root and endpoints are distributed and remotely located from each other, there is a need to de-couple the link between the PCIe's bus components. For example, it would be desirable to allow PCIe connectivity over a wireless medium or over a network. However, extending the distance of the link between a PCIe root and endpoint component would significantly increase the latency of the link, and therefore degrade the performance of the bus.

Thus, it would be advantageous to provide a high performance interconnect bus that would allow distributed connectivity.

SUMMARY OF THE INVENTION

An embodiment of the invention provides a distributed interconnect bus apparatus enabling the connection of peripheral devices. The apparatus includes a first bridge coupled to a root component of an interconnect bus; and a second bridge coupled to an endpoint component of an interconnect bus. The apparatus may further include an acknowledgment (ACK) termination for generating at least an ACK signal; and a flow control mechanism including at least one receiver buffer for temporarily saving data packets of multiple different transactions.

DETAILED DESCRIPTION OF THE INVENTION

In view of the shortcomings of the conventional interconnect buses, such as a PCI or a PCIe, the invention provides a distributed interconnect bus apparatus that can be installed between a root and endpoint components. The apparatus can be utilized to wirelessly connect peripheral devices or to allow the connectivity of such devices over a network. The distributed interconnect bus apparatus provides advantageous mechanisms for reducing acknowledgment (ACK) timeout and flow control update latencies and advantageously utilizes interconnect bus bandwidth.

Figure 1:
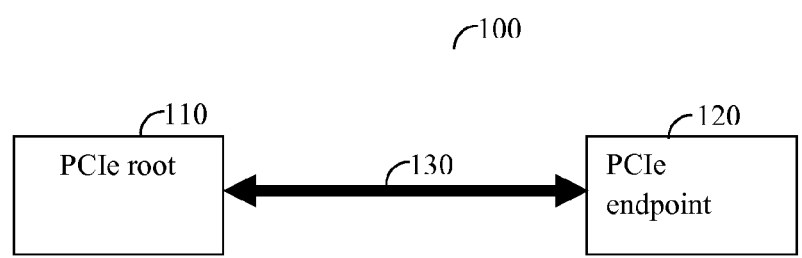
FIG. 1—is a block diagram showing a PCIe bus architecture.
Figure 2:
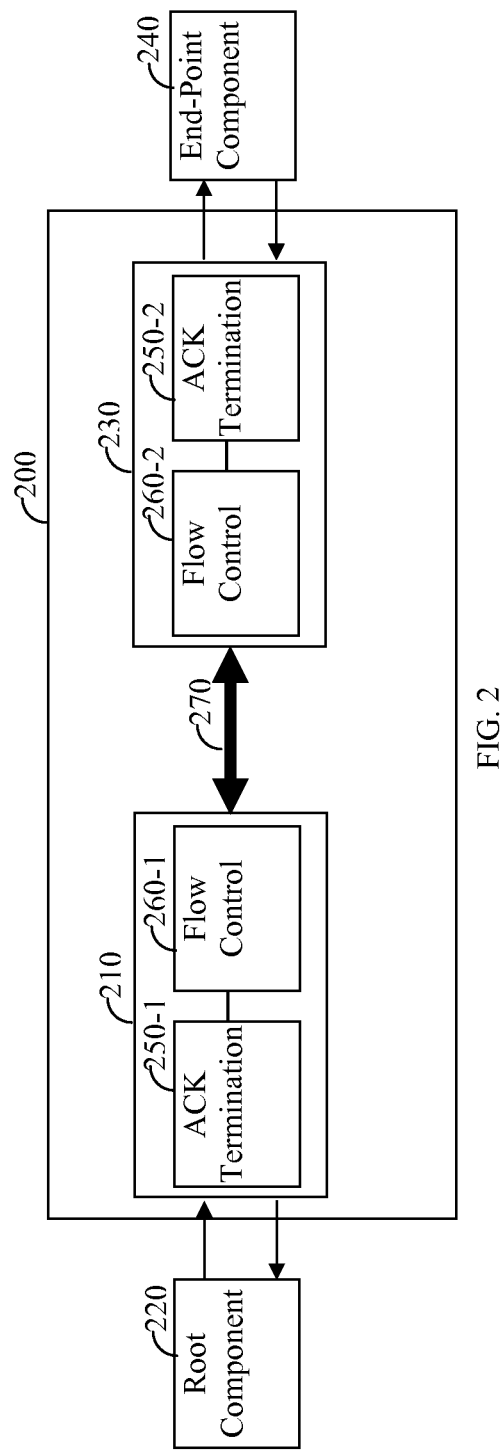
FIG. 2—is a block diagram of a distributed interconnect bus apparatus implemented in accordance with an embodiment of the invention.

FIG. 2 shows a non-limiting and exemplary diagram of a distributed interconnect bus apparatus 200 implemented in accordance with an embodiment of the invention. The apparatus 200 comprises a bridge 210 connected to a root component 220 and a second bridge 230 connected to an endpoint component 240. The bridges 210 and 230 communicate over a link 270 which is the medium used to transfer the data between the components 220 and 240. The medium may be, but is not limited to, air, a copper cable, a fiber optic, and so on. That is, the interconnect bus apparatus 200 forms a distributed bus for transferring data between remote peripheral devices coupled to the root component 220 and endpoint component 240. The transport protocol used to carry data between the components 220 and 240 may be, but is not limited to, IEEE 802.11x (Wi-Fi), Ethernet, Infiniband, and likes.

Each bridge of the apparatus 200 includes an acknowledgment (ACK) termination 250 and a flow control mechanism 260. The ACK termination 250 is installed prior to a link 270 and acknowledges the reception of packets. That is, the ACK terminations 250-1 and 250-2 acknowledge data packets respectively sent from the root component 220 and the endpoint component 240 preferably by generating ACK signals. Therefore, the ACK terminations 250 eliminate an ACK timeout expiration (e.g., the expiration of a time window defined in the PCIe specification) that may result from the delay on a link 270, which would unnecessarily cause retransmission of packets (e.g., transaction layer packets). In an exemplary embodiment of the invention, the ACK terminations 250 can be implemented as a PCIe data link layer or to perform only data integrity functions of the link layer.

The flow control mechanisms 260 eliminate the flow control roundtrip delays and its ripple effect on bus transactions. Each flow control mechanism 260 includes at least one receiver buffer (not shown) that is designed to compensate for the delay of the link 270. In an exemplary embodiment of the invention each flow control mechanism 260 can be implemented using a full PCIe bridge, a switch port, or to perform only flow control functions of the bridge.

In accordance with an exemplary embodiment of the invention, the distributed interconnect bus apparatus 200 is fully compatible with the PCIe specification. In particular, in this embodiment the root component 220 may be either a PCIe root or a PCIe switch, the endpoint component 240 is a PCIe endpoint, and the bridges 210 and 230 are PCIe bridges that includes the implementation of the ACK terminations 250 and flow control mechanisms 260.

Figure 3:
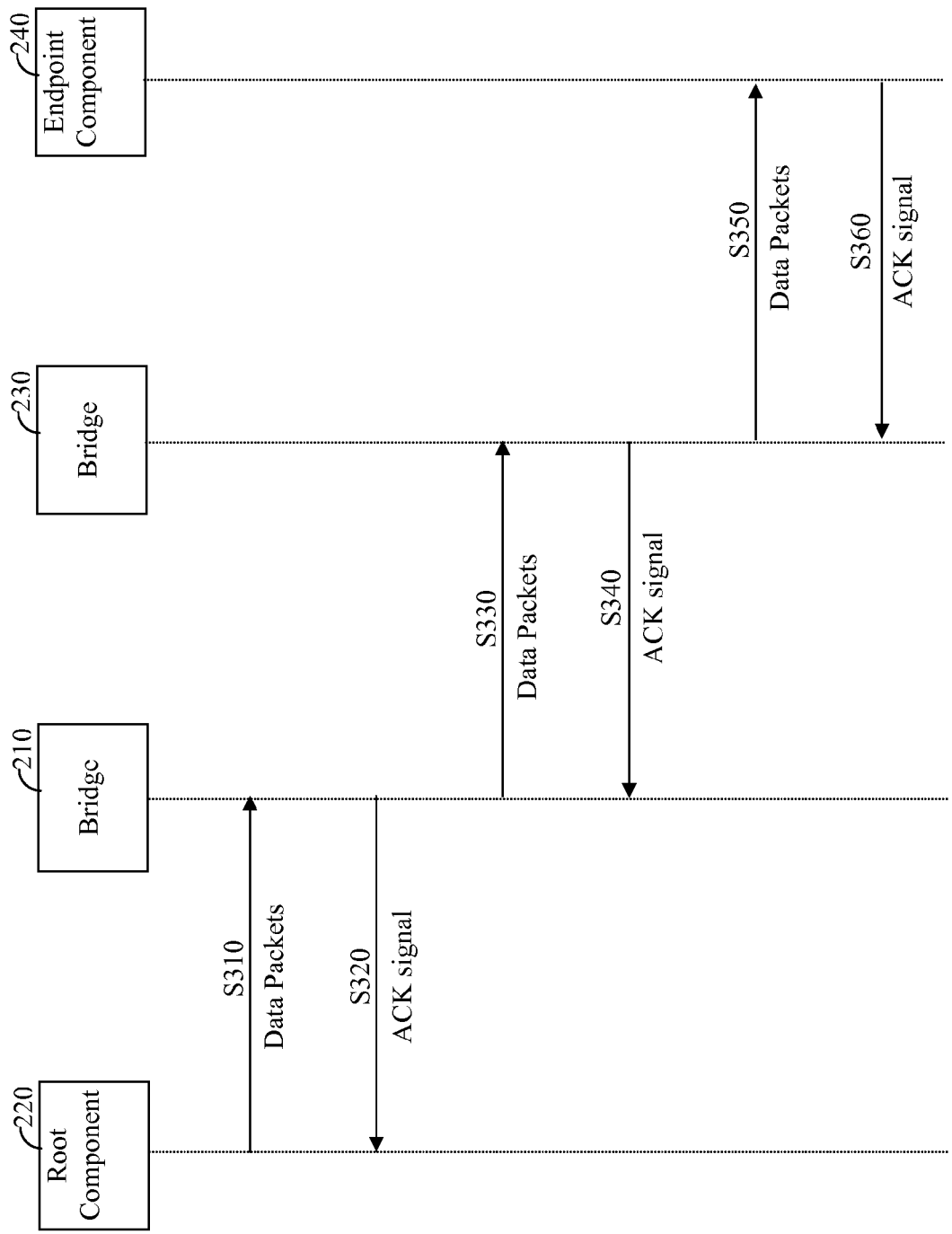
FIG. 3—is a diagram describing the operation of the distributed interconnect bus apparatus according to principles of the invention.

FIG. 3 shows a diagram describing the operation of the interconnect bus apparatus 200 in accordance with an exemplary embodiment of the invention. The operation of the distributed interconnect bus apparatus 200 will be described with reference to a specific implementation of a PCIe distributed interconnect bus apparatus. That is, the root component 220, bridges 210 and 230 as well as the endpoint 240 support the layered protocol (i.e., transaction, data link, and physical layers) of a PCIe bus.

At S310, the root component 220 transmits transaction layer packets addressed to the endpoint component 240. The bridge 210 captures the packets and temporarily saves the packets in a receiver buffer in its control flow mechanism 260-1. In addition, the bridge 210 by its ACK termination 250-1 generates an ACK signal, which is sent at S320 to the root component 220. The root component 220 upon reception of the ACK message may send new transaction layer packets.

At S330, the bridge 210 forwards the transaction layer packets to the bridge 230 over the link 270 and waits for an ACK signal. During the waiting time, the bridge 210 may receive additional packets from the root component 220 which are also saved in the buffer in the control flow mechanism 260-1. With this aim, this size of the buffer (i.e., the number of credits) of bridge 210 is big enough to maintain packets of multiple different transactions.

The bridge 230 receives the packets and temporarily saves them in a receiver buffer in its control flow mechanism 260-2. In addition, the bridge 230 by its ACK termination 250-2 generates an ACK signal, which is sent at S340 to the bridge 210. The bridge 210 upon reception of the ACK signal deletes the packets that belong to the acknowledged transaction from its buffer.

At S350, the bridge 230 sends the transaction layer packets to the endpoint component 240 and waits for an ACK signal. During this time, the bridge 230 may receive additional packets from the bridge 210. Such packets are also saved in the buffer in the control flow mechanism 260-2. With this aim, this size of the buffer (i.e., the number of credits) of bridge 230 is big enough to maintain packets of multiple different transactions. At 360, upon reception of the ACK signal from the endpoint component 240, the bridge 230 deletes the packets that belong to the acknowledged transaction from its buffer. It should be noted that the distributed interconnect bus apparatus handles transaction layer packets from the endpoint component 240 in the same manner described in detail above.

Figure 4:
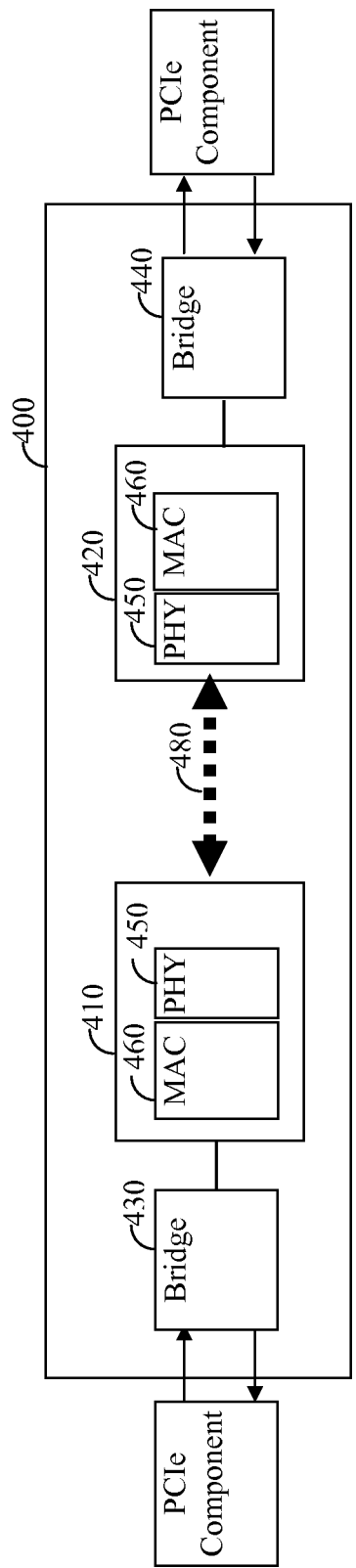
FIG. 4—is a block diagram of a distributed interconnect bus apparatus utilized to connect peripheral devices over a wireless medium.

FIG. 4 shows an exemplary and non-limiting diagram of a distributed interconnect bus apparatus 400 enables connection of peripheral devices over a wireless medium. The apparatus 400 includes wireless transceivers 410 and 420 which respectively are coupled to bridges 430 and 440. Each bridge includes an ACK termination and a control flow mechanism having similar functionality described in greater detail above.

The wireless transceivers 410 and 420 implement a wireless modem, such as an orthogonal frequency division multiplexing (OFDM) modem, a single-carrier modem, a multi-carrier modem, and the likes. Furthermore, the wireless transceivers 410 and 420 can implement sophisticated communication techniques, such as multiple-input-multiple-output (MIMO), beam forming, advanced coding, space time block codes, and so on. Each of the wireless transceivers 410 and 420 includes a physical (PHY) layer 450 and a medium access (MAC) layer 460 operating according to the transport protocol, e.g., IEEE 802.x that carries traffic over the wireless link 480. In one embodiment to provide reliable and in-order delivery of data packets between the transceivers 410 and 420, each MAC layer 460 performs error detection and correction to reduce the error rate in the transmitted data. This can be achieved using, for example, a cyclic redundancy check (CRC) or other error correction techniques. Packets with data integrity problems are retransmitted by the sender transceiver. Each bridge is coupled to a PCIe component including at least one of a root, an endpoint, or a switch. That is, the connection may be formed between at least one of the following PCIe components: root-endpoint, root-switch, switch-endpoint, and switch-switch.

Figure 5:
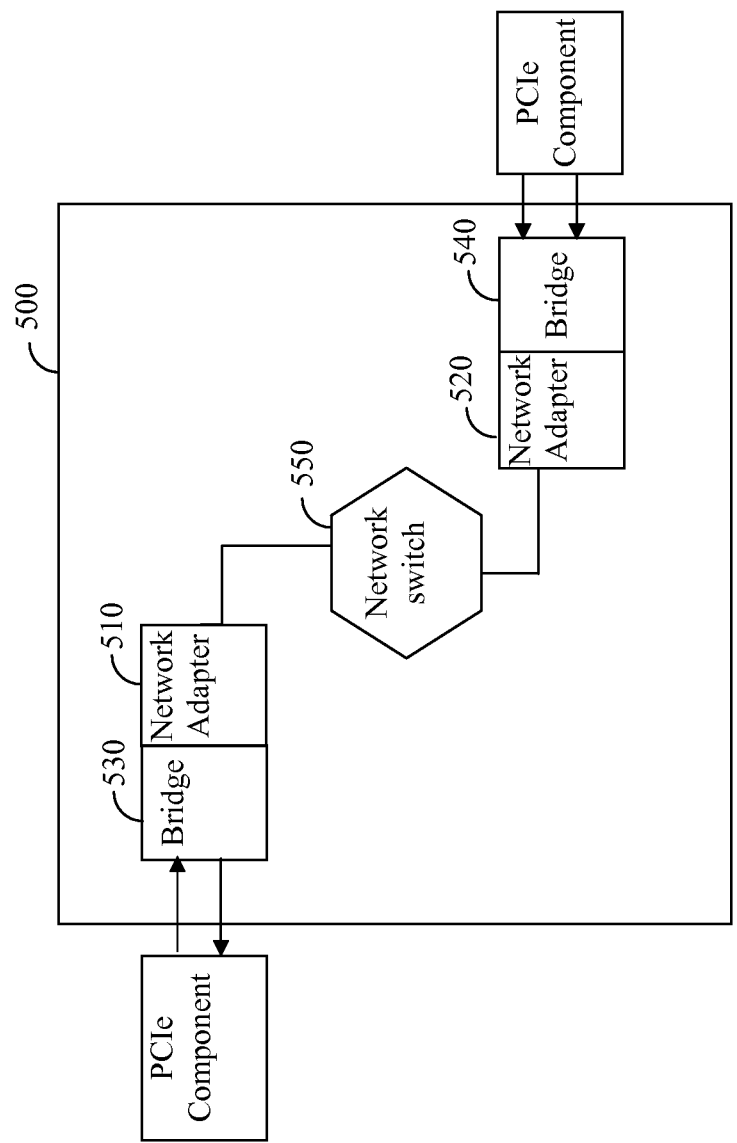
FIG. 5—is a block diagram of a distributed interconnect bus apparatus utilized to connect peripheral devices over a network.

FIG. 5 shows an exemplary and non-limiting diagram of a distributed interconnect bus apparatus 500 enabling connection of peripheral devices over a network, including, but not limited to, a personal area network (PAN) a local area network (LAN), a wide area network (WAN), a metropolitan area network (MAN), and the likes. The apparatus 500 includes network adapters 510 and 520 which respectively are coupled to bridges 530 and 540. Each bridge includes an ACK termination and a control flow mechanism having the same functionality as described in greater detail above. The apparatus 500 further includes a network switch 550 that connects the network adapters 510 and 520. The network adapters 510 and 520 connect the PCIe components to the network. Each network adapter implements a physical layer and data link layer to provide a physical access to a networking medium and a low-level addressing system through the use of MAC addresses. Each bridge is coupled to a PCIe components including at least one of a root, an endpoint, or a switch. That is, the connection may be formed between at least one of the following PCIe components: root-endpoint, root-switch, switch-endpoint, and switch-switch.

It would be apparent to those of ordinary skill in the art that the distributed interconnect bus can be adapted for the use with peripheral devices utilizing connection formats, such as USB3, PCIe second generation, PCIe third generation Hypertransport, Infiniband, serial and fast point-to-point interconnects, and the likes.

The principles of the invention may be implemented in hardware, software, firmware or any combinations thereof. The software may be implemented as an application program tangibly embodied on a program storage unit or computer readable medium. The application program may be uploaded to, and executed by, a machine comprising any suitable architecture, for example a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention. All examples and conditional language recited herein are intended for pedagogical purposes to aid the reader in understanding the principles of the invention and the concepts contributed by the inventors to furthering the art, and are to be construed as being without limitation to such specifically recited examples and conditions.

All statements herein reciting principles, aspects, and embodiments of the invention, as well as specific examples thereof, are intended to encompass both structural and functional equivalents thereof. It is intended that such equivalents include both currently known equivalents as well as equivalents developed in the future, i.e., any elements developed that perform the same function, regardless of structure. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

What is claimed is:

1. An apparatus for enabling a distributed connection of peripheral devices, comprising:
   a first bridge coupled to a root component of a PCI Express (PCIe), the first bridge comprising:
      a first acknowledgment (ACK) termination configured as a data link layer of the PCIe bus; and
      a first flow control mechanism,
      the first ACK termination being adapted to send, to the root component, an ACK signal upon reception of each PCIe transaction layer packet; and
   a second bridge communicatively coupled to the first bridge over a distributed medium, wherein:
      the first bridge and the second bridge are configured to exchange PCIe transaction layer packets over the distributed medium,
      the second bridge is also coupled to an endpoint component of the PCIe bus,
      the second bridge comprises a second ACK termination and a second flow control mechanism,
      the second ACK termination is configured to send, to the endpoint component, an ACK signal upon reception of each transaction layer packet received from the endpoint component,
      the second ACK termination is configured as a data link layer of the PCIe bus, and
      the first flow control mechanism and the second flow control mechanism are each configured to store multiple PCIe transaction layer packets to compensate for a transmission delay of PCIe transaction layer packets over the distributed medium between the first and second bridge.

2. The apparatus of claim 1, wherein the first flow control mechanism comprises at least one receiver buffer for temporarily storing multiple transaction layer packets of multiple different PCIe transactions.

3. The apparatus of claim 2, wherein the multiple PCIe transaction layer packets comprise data packets sent from at least one of: the root component or the second bridge.

4. The apparatus of claim 1, wherein the second flow control mechanism comprises at least one receiver buffer for temporarily storing multiple PCIe transaction layer packets of multiple different PCIe transactions.

5. The apparatus of claim 4, wherein the multiple PCIe transaction layer packets comprise data packets sent from at least one of: the endpoint component or the first bridge.

6. The apparatus of claim 1, wherein at least one of the root component or the endpoint comprises: a PCIe root, a PCIe switch, or a PCIe endpoint.

7. The apparatus of claim 1, further comprising:
   a first wireless transceiver coupled to the first bridge;
   a second wireless transceiver coupled to the second bridge, wherein the first wireless transceiver and the second wireless transceiver are communicatively coupled to a wireless medium to enable the first bridge and the second bridge to exchange PCIe transaction layer packets over the wireless medium.

8. The apparatus of claim 7, wherein each of the first wireless transceiver and the second wireless transceiver comprises a wireless modem.

9. The apparatus of claim 1, further comprising:
   a first network adapter coupled to the first bridge;
   a second network adapter coupled to the second bridge, wherein the first network adapter and the second network adapter are communicatively coupled to the distributed medium to enable the first bridge and the second bridge to exchange PCIe transaction layer packets over the distributed medium.

10. The apparatus of claim 9, wherein the network includes at least one of: a personal area network (PAN), a local area network (LAN), a wide area network (WAN), or a metropolitan area network (MAN).

11. A method for enabling a distributed connection of peripheral devices, comprising:
   sending, from a first ACK termination of a first bridge, to a root component coupled to the first bridge, a first ACK signal upon reception of each PCI express (PCIe) transaction layer packet sent from the root component during a first PCIe transaction;
   storing, at a first flow control mechanism of the first bridge, each PCIe transaction layer packet received from the root component during the first PCIe transaction to compensate for a transmission delay of PCIe transaction layer packets over a distributed medium between the first and a second bridge;

sending, from a second ACK termination of the second bridge, to an endpoint component coupled to the second bridge, a second ACK signal upon reception of each PCIe transaction layer packet received from the endpoint component during the first PCIe transaction;

storing, at the second flow control mechanism, each PCIe transaction layer packet received from the endpoint component during the first PCIe transaction to compensate for a transmission delay of PCIe transaction layer packets over the distributed medium between the first and second bridge; and exchanging the received PCIe transaction layer packets between the first bridge and the second bridge communicatively coupled over the distributed medium.

12. The method of claim 11, further comprising:

receiving, at the first bridge, from the second ACK termination, a third ACK signal for each PCIe transaction layer packet successfully received by the second bridge from the first bridge;

deleting, at the first flow control mechanism, each stored PCIe transaction layer packet for which the third ACK signal is received;

receiving, at the second bridge, from the first ACK termination, a fourth ACK signal for each PCIe transaction layer packet successfully received by the first bridge from the second bridge; and deleting, at the second flow control mechanism, each stored PCIe transaction layer packet for which the fourth ACK signal is received.

13. The method of claim 11, further comprising:

receiving, at the first bridge, PCIe transaction layer packets for a second PCIe transaction from the root component in response to sending the first ACK signal;

storing the PCIe transaction layer packets for the second PCIe transaction in the first flow control mechanism;

sending, from the first ACK termination, a third ACK signal to the root component upon reception of each PCIe transaction layer packet for the second PCIe transaction; and forwarding the PCIe transaction layer packets for the second PCIe transaction to the second bridge.

14. The method of claim 11, further comprising:

receiving, at the second bridge, PCIe transaction layer packets for a second PCIe transaction from the endpoint component in response to sending the second ACK signal;

storing the PCIe transaction layer packets for the second PCIe transaction in the second flow control mechanism;

sending, from the second ACK termination, a third ACK signal to the endpoint component upon reception of each PCIe transaction layer packet for the second PCIe transaction; and forwarding the PCIe transaction layer packets for the second PCIe transaction to the first bridge.

15. The method of claim 11, wherein:

the first bridge comprises a first wireless transceiver;
the second bridge comprises a second wireless transceiver; and
the first wireless transceiver and the second wireless transceiver are communicatively coupled to a wireless medium to enable the first bridge and the second bridge to exchange PCIe transaction layer packets over the wireless medium.

16. The method of claim 11, wherein:

the first bridge comprises a first network adapter;
the second bridge comprises a second network adapter; and
the first network adapter and the second network adapter are communicatively coupled to a wireless medium to enable the first bridge and the second bridge to exchange PCIe transaction layer packets over the wireless medium.

17. A distributed interconnect bus, comprising:

one or more wireless transceivers;

a first bridge coupled to a root component of a PCI Express (PCIe) bus, the first bridge comprising:
 a first acknowledgment (ACK) termination configured as a data link layer of the PCIe bus; and
 a first flow control mechanism; and a second bridge communicatively coupled to the first bridge, wherein:
 the first bridge and the second bridge are configured to exchange PCIe transaction layer packets via the wireless transceivers,
 the first ACK termination is adapted to send, to the root component, an ACK signal upon reception of each PCIe transaction layer packet
 the second bridge is also coupled to an endpoint component of the PCIe bus,
 the second bridge comprises a second ACK termination and a second flow control mechanism,
 the second ACK termination is configured to send to the endpoint component, an ACK signal upon reception of each transaction layer packet received from the endpoint component,
 the second ACK termination is configured as a data link layer of the PCIe bus, and
 the first flow control mechanism and the second flow control mechanism are each configured to store multiple PCIe transaction layer packets to compensate for a transmission delay of PCIe transaction layer packets over a distributed medium between the first and second bridge.

* * * * *